United States Patent
Uetsuji et al.

(10) Patent No.: US 7,560,850 B2
(45) Date of Patent: Jul. 14, 2009

(54) INTERPHASE INSULATING SHEET AND STATOR HAVING THE SAME

(75) Inventors: Kiyoshi Uetsuji, Kariya (JP); Hiroshi Fukasaku, Kariya (JP)

(73) Assignee: Kabushiki Kaisha Toyota Jidoshokki (JP)

( * ) Notice: Subject to any disclaimer, the term of this patent is extended or adjusted under 35 U.S.C. 154(b) by 533 days.

(21) Appl. No.: 11/274,363

(22) Filed: Nov. 15, 2005

(65) Prior Publication Data

US 2006/0131987 A1     Jun. 22, 2006

(30) Foreign Application Priority Data

Nov. 16, 2004   (JP)   ............................. 2004-332205

(51) Int. Cl.
    *H02K 3/46* (2006.01)
(52) U.S. Cl. ........................................ 310/260; 310/194
(58) Field of Classification Search ................ 310/215, 310/260, 270, 194
    See application file for complete search history.

(56) References Cited

U.S. PATENT DOCUMENTS

| | | | | |
|---|---|---|---|---|
| 3,334,255 A | * | 8/1967 | Peters | 310/215 |
| 5,093,543 A | * | 3/1992 | Patton et al. | 174/138 E |
| 6,064,131 A | * | 5/2000 | DeHart | 310/198 |
| 6,995,491 B2 | * | 2/2006 | Kimura et al. | 310/215 |
| 7,132,776 B2 | * | 11/2006 | Tagami et al. | 310/215 |
| 2004/0056558 A1 | * | 3/2004 | Tagami et al. | 310/260 |

FOREIGN PATENT DOCUMENTS

JP    2003/333785    11/2003

* cited by examiner

*Primary Examiner*—Dang D Le
(74) *Attorney, Agent, or Firm*—Woodcock Washburn LLP

(57) ABSTRACT

An interphase insulating sheet is used in a stator including a core and a multiphase winding having a plurality of phase windings for insulating the phase windings from one another. The interphase insulating sheet includes a cut portion formed in the interphase insulating sheet. The cut portion indicates a direction opposite to a direction in which the interphase insulating sheet is inserted in the stator.

20 Claims, 3 Drawing Sheets

INTERPHASE INSULATING SHEET AND STATOR HAVING THE SAME

BACKGROUND OF THE INVENTION

The present invention relates to an interphase insulating sheet, and more particularly to an interphase insulating sheet for insulating the phase windings of a stator from one another.

The stator of a multiphase motor, for example, a three-phase motor, includes a stator core with plural slots and stator windings. The stator windings corresponding to a U-phase winding, a V-phase winding and a W-phase winding are sequentially and circumferentially arranged at positions of the stator core which corresponds to the exciting position of each phase. Namely, the stator includes a three-phase distributed winding. Each of the phase windings is composed of plural conductors coated with enamel. The part of each phase winding which extends between the slots is located at the end of the stator core thereby to form a coil end.

In order to secure insulation of the phase windings from one another at the coil end of the above-described stator, a sheet-like insulating member, which is referred to as an interphase insulating sheet, is inserted between any two of the phase windings. That is, two interphase insulating sheets are inserted between the U-phase winding, the V-phase winding and the W-phase winding thereby to keep each phase winding out of contact with the other phase windings.

Unexamined Japanese Patent Publication No. 2003-333785 discloses an example of a stator using the above interphase insulating sheet. In the case that such an interphase insulating sheet is used for insertion into the stator, however, the insulating sheet may be moved toward the coil end of the stator or away from the stator core due to work operation of provisional lacing or shaping of coil ends which is usually performed subsequently to the insertion process of insulating sheet, with the result that part of the phase winding may come into contact with other phase winding. Therefore, it has been necessary that the interphase insulating sheet moved away from the stator core should be pushed back toward the stator core by hand or something for ensuring insulation of the phase windings.

The present invention is directed to an interphase insulating sheet that is hard to move away from a stator core after the interphase insulating sheet has been inserted in a stator.

SUMMARY OF THE INVENTION

According to the present invention, an interphase insulating sheet is used in a stator including a core and a multiphase winding having a plurality of phase windings for insulating the phase windings from one another. The interphase insulating sheet includes a cut portion formed in the interphase insulating sheet. The cut portion indicates a direction opposite to a direction in which the interphase insulating sheet is inserted in the stator.

The present invention also provides a stator that includes a core, a multiphase winding and an interphase insulating sheet. The multiphase winding is wound on the core and includes a plurality-of phase windings. The interphase insulating sheet is installed between the phase windings for insulating the phase windings from one another. The interphase insulating sheet includes a cut portion formed in the interphase insulating sheet. The cut portion indicates a direction opposite to a direction in which the interphase insulating sheet is inserted in the stator.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

Figure 1:
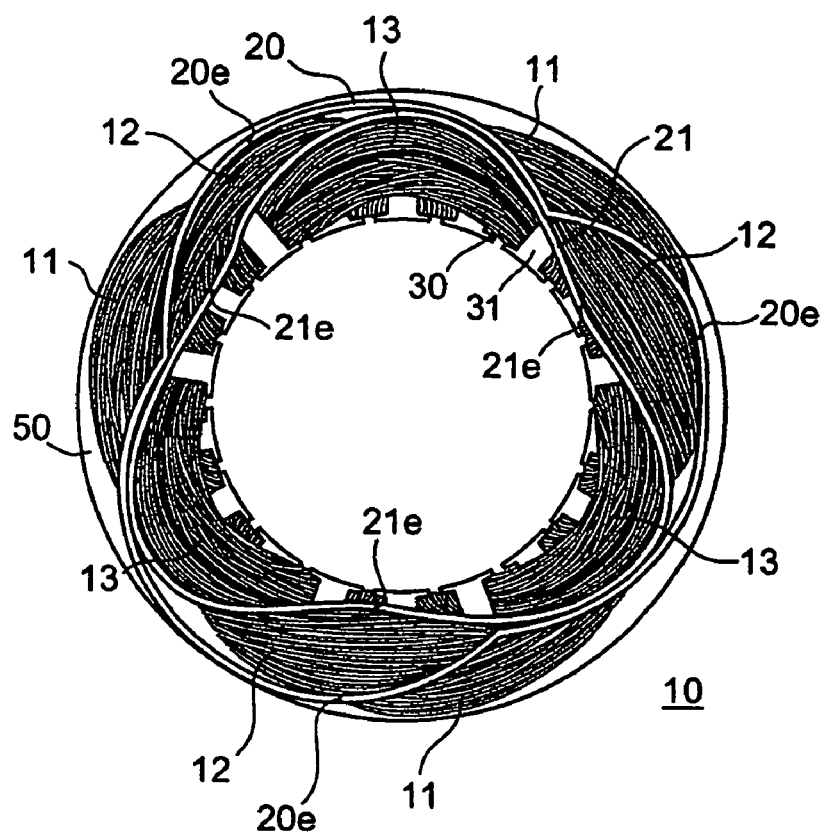
FIG. 1 is an end view of a coil end of a stator in which are installed first and second interphase insulating sheets according to a first preferred embodiment.

The following will describe a first preferred embodiment according to the present invention while having reference to FIGS. 1 through 4. Referring firstly to FIG. 1, two interphase insulating sheets of the first preferred embodiment are inserted in a stator 10. FIG. 1 shows an end view of the stator 10 as seen in its axial direction. The stator 10 is a known motor stator that has a three-phase distributed winding and is used in a vehicle.

The stator 10 has a core 50 that is a hollow cylinder with eighteen hooks 31 extending radially inward of the core 50 and having a T-shaped cross section perpendicular to the axis of the core 50. Region surrounded by any two adjacent hooks 31 provides a slot 30. Namely, the core 50 has eighteen slots 30 extending in the axial direction thereof. The opposite ends of each slot 30 are open to the outside of the core 50 for allowing a phase winding to pass therethrough.

The eighteen slots 30 are circumferentially arranged at regular intervals. Namely, any two adjacent slots 30 are spaced from each other in the circumferential direction of the core 50 at an angular interval of 20°. The two adjacent slots 30 are used by two different phase windings. The three-phase winding wound on the core 50 includes a U-phase winding 11, a V-phase winding 12 and a W-phase winding 13, each of which is composed of plural conductors covered with enamel. Each of the phase windings 11 through 13 is inserted in respective six slots 30 which are spaced at an angular interval of 60° in the circumferential direction of the core 50. Namely, between any adjacent slots 30 for receiving therein the same phase winding, there are two slots 30 for receiving therein the other phase windings.

The following will describe the structure of the phase windings at the coil end of the stator 10. The U-phase winding 11 passes through one slot 30 and appears at one end of the core 50. The U-phase winding 11 then passes in the opposite direction through another slot 30 for the U-phase winding 11 which is angularly spaced from the one slot 30 at 60° interval, and reaches the other end of the core 50. The U-phase winding 11 has thus same structure at three angularly spaced positions at one end of the core 50 as shown in FIG. 1 and at the end of the opposite side of the core 50. The U-phase winding 11 is thus inserted in the six slots 30. The V-phase winding 12 and the W-phase winding 13 are disposed in the same manner as the U-phase winding 11.

The slot 30 located adjacent to the slot 30 for the U-phase winding 11 in a one-way circumferential direction is used for receiving therein the V-phase winding 12. The slot 30 located adjacent to the slot 30 for the V-phase winding 12 in a one-way circumferential direction is used for receiving therein the W-phase winding 13. Furthermore, the slot 30 for the W-phase winding 13 is adjacent to another slot 30 for receiving therein the U-phase winding 11 in a one-way circumferential direction. Namely, the slot 30 for the U-phase, the slot 30 for the V-phase and the slot 30 for the W-phase are circumferentially arranged in this order.

At the end of the stator 10, two interphase insulating sheets, that is, first and second interphase insulating sheets 20 and 21 are used for insulating the phase windings 11 through 13 from one another. During assembling of the stator 10, the first interphase insulting sheet 20 is installed between the U-phase winding 11 and the V-phase winding 12 and between the U-phase winding 11 and the W-phase winding 13 by inserting toward the core 50 for insulating the phase windings 11 through 13 from one another. The second interphase insulating sheet 21 is installed between the W-phase winding 13 and the U-phase winding 11 and between the W-phase winding 13 and the V-phase winding 12 by inserting toward the core 50 for insulating the phase windings 11 through 13 from one another. The first and second interphase insulating sheets 20 and 21 are inserted in the direction toward the drawing surface of FIG. 1 from the viewer of the drawing.

The first interphase insulating sheet 20 functions to insulate the U-phase winding 11 and the V-phase winding 12 from one another. The second interphase insulating sheet 21 functions to insulate the V-phase winding 12 and the W-phase winding 13 from one another. The first and second interphase insulating sheets 20 and 21 also function to insulate the W-phase winding 13 and the U-phase winding 11 from one another. FIG. 1 shows the end of the core 50 at one side thereof, and the coil end of the opposite side of the stator 10 is formed in a similar manner.

Figure 2:
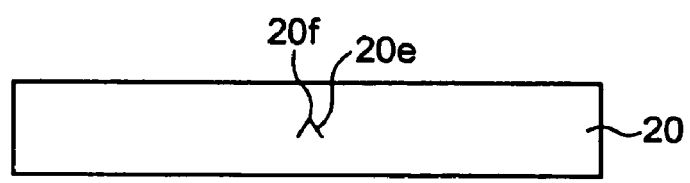
FIG. 2 is a view of the first interphase insulating sheet according to the first preferred embodiment.

Referring to FIG. 2 showing the shape of the first interphase insulating sheet 20, the sheet 20 is made in the form of a thin film having sufficient length and width for insulating the U-phase winding 11 from the other phase windings at the coil end of the stator 10 as shown in FIG. 1. Specifically, the first interphase insulating sheet 20 has a sufficient length for rounding the stator 10 completely along the U-phase winding 11 and a sufficient width for covering the parts of the phase windings that protrude from the end of the slots 30 at the coil end of the stator 10 and are in contact with the different phase windings.

The first interphase insulating sheet 20 of the first embodiment is made of polyethylene naphthalate (PEN). Alternatively, the first interphase insulating sheet 20 may be made of polyethylene terephthalate (PET), polyphenylene sulfide (PPS) or any other material as long as it functions to insulate the phase windings from one another satisfactorily.

The first interphase insulating sheet 20 is formed with an inverted V-shaped cut portion 20e having a tip 20f. The cut portion 20e is bent toward the side on which the first interphase insulating sheet 20 is not in contact with the U-phase winding 11 when the first interphase insulating sheet 20 is inserted in the coil end of the stator 10. More specifically, the cut portion 20e is bent toward the side of the V-phase winding 12, that is, the radially inward direction of the core 50, when the first interphase insulating sheet 20 is inserted in the coil end of the stator 10 as shown in FIG. 1.

It is noted that any part of the cut portion 20e may be bent as required. For example, a part of the cut portion 20e may be bent or, alternatively, the entire cut portion 20e may be bent. The cut portion 20e may be formed upside down, that is, the tip 20f or the cut portion 20e indicates a direction opposite to the direction in which the first interphase insulating sheet 20 is inserted into the coil end of the stator 10. It is noted that only one cut portion 20e is shown in FIG. 2 for the sake of convenience of the explanation. The first interphase insulating sheet 20 of the first preferred embodiment is formed with three cut portions 20e as shown in FIG. 1.

Figure 4:
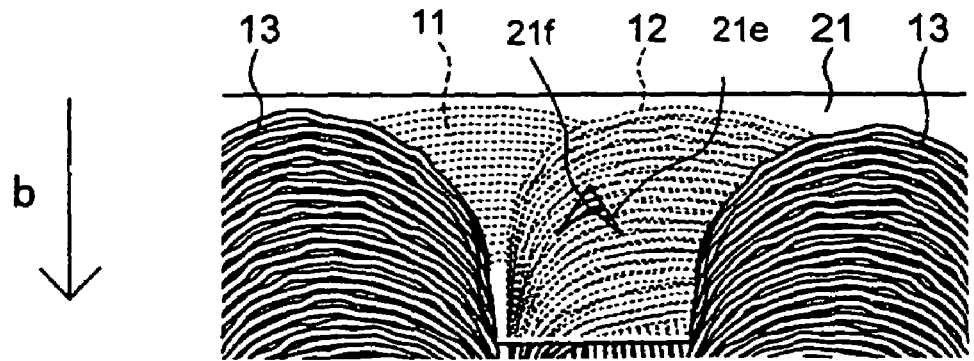
FIG. 4 is a partially enlarged view of the coil end of the stator in which is installed the second interphase insulating sheet according to the first preferred embodiment.

The second interphase insulating sheet 21 is made of the same material and has substantially the same shape as the first interphase insulating sheet 20. Like the first interphase insulating sheet 20, the second interphase insulating sheet 21 is formed with three inverted V-shape cut portions 21e having tips 21f as shown in FIGS. 1 and 4. The cut portion 21e of the second interphase insulating sheet 21 is bent toward the side on which the second interphase insulating sheet 21 is not in contact with the W-phase winding 13 when the second interphase insulating sheet 21 is inserted in the stator 10. More specifically, the cut portions 21e are bent toward the side of the V-phase winding 12, that is, the radially outward direction of the core 50, when the second interphase insulating sheet 21 is inserted in the coil end of the stator 10 as shown in FIG. 1.

Figure 3:
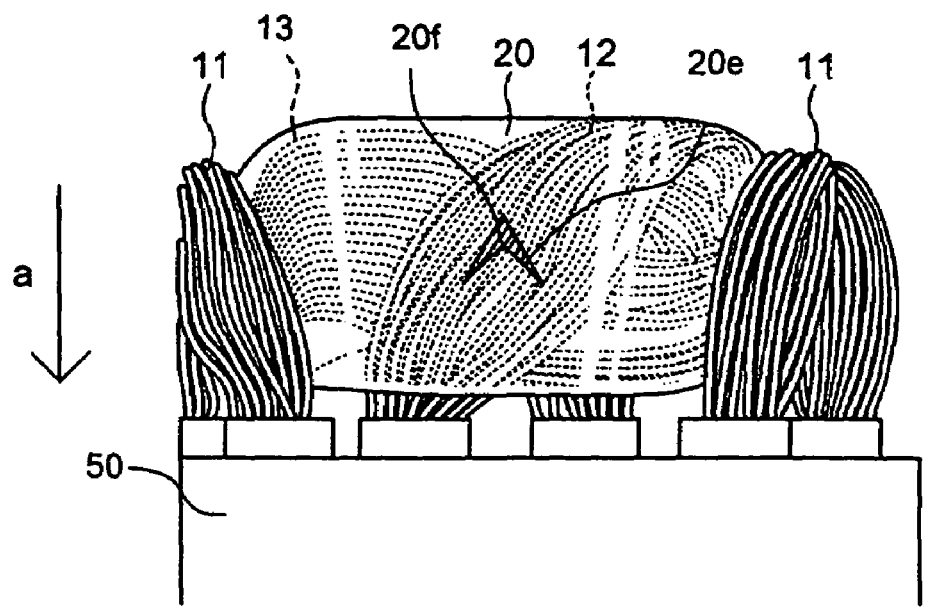
FIG. 3 is a partially enlarged view of the coil end of the stator in which is installed the first interphase insulating sheet according to the first preferred embodiment.

FIG. 3 shows the state where the first interphase insulating sheet 20 is inserted at the coil end of the stator 10 between the U-phase winding 11 and the V-phase winding 12 and between the U-phase winding 11 and the W-phase winding 13. The insertion direction in which the first interphase insulating sheet 20 is inserted in the stator 10 is indicated by the arrow a in FIG. 3. The cut portion 20e is located adjacently to the part of the V-phase winding 12 with the tip 20f directed toward the coil end side, that is, toward the opposite side to the core 50, as shown in FIG. 3. The cut portion 20e is bent toward adjacent V-phase winding 12, so that a part of the cut portion 20e including the tip 20f is easily engaged with the V-phase winding 12. Therefore, when a force that moves the first interphase insulating sheet 20 away from the core 50 is applied to the first interphase insulating sheet 20 after the sheet 20 has been inserted in the stator 10, the part of the cut portion 20e including the tip 20f is easily engaged with the V-phase winding 12.

The first interphase insulating sheet 20 is provided for insulating the U-phase winding 11 from the other phase windings. Thus, the cut portion 20e is located in the part of the first interphase insulating sheet 20, which is out of contact with the U-phase winding 11, in order to prevent deterioration of the insulation performance due to a clearance made by bending the cut portion 20e. Specifically, the cut portion 20e is provided such that it is not located between any two of the phase windings 11 through 13. Also, the cut portion 20e is provided where one side of the first interphase insulating sheet 20 is exposed without having a contact with any of the phase windings 11 through 13. As described above, the first interphase insulating sheet 20 is inserted in the stator 10 so that the cut portion 20e is not located between any two of the phase windings 11 through 13.

FIG. 4 shows the state where the second interphase insulating sheet 21 is inserted at the coil end of the stator 10 between the W-phase winding 13 and the U-phase winding 11 and between the W-phase winding 13 and the V-phase winding 12. The insertion direction in which the second interphase insulating sheet 21 is inserted in the stator 10 is indicated by the arrow b in FIG. 4. The cut portion 21e is located in the second interphase insulating sheet 21 at the same position as the first interphase insulating sheet 20. It is noted, however, that the cut 21e is located in the part of the second interphase insulating sheet 21 which is out of contact with the W-phase winding 13.

As described above, the first and second interphase insulating sheets 20 and 21 are previously formed with the cut portions 20e and 21e where the cut portions 20e and 21e are not located between any two of the phase windings 11 through 13 and where the sheets 20 and 21 are exposed before the sheets 20 and 21 are inserted in the stator 10. The first and second interphase insulating sheets 20 and 21 are inserted between the phase windings 11 through 13 so that the tips 20f and 21f are directed toward the coil end side. Therefore, bending the cut portions 20e and 21e toward the V-phase winding 12, the cut portions 20e and 21e are engaged with the V-phase winding 12.

After the first and second interphase insulating sheet 20 and 21 have been inserted in the stator 10 as described above, subsequent work operations are performed. For example, provisional lacing work operation is performed as is done for the conventional stator. In this lacing operation, each of the phase windings 11 through 13 is tied and fixed with thread for suppressing the generation of noise caused by the vibration of the phase windings. Additionally, shaping of coil ends is performed as is done for the conventional stator for reducing the clearance between each of the phase windings 11 through 13 and the core 50 thereby to reduce the space occupied by each of the phase windings 11 through 13.

When a force that moves the interphase insulating sheet away from the core is applied to the interphase insulating sheet during such work operations after the interphase insulating sheet has been inserted, the cut portion is engaged with the phase winding, so that the interphase insulating sheet is prevented from moving away from the core. Thus, the interphase insulating sheet is neither moved away from the core nor pulled out of the stator. Therefore, re-adjustment of the position and re-insertion of the interphase insulating sheet are not required, thereby improving the efficiency of the work operation. In the first embodiment as described above, since the cut portions 20e and 21e are engaged with the phase winding, the first and second interphase insulating sheets 20 and 21 of the first preferred embodiment are prevented from moving toward the coil end side of the stator 10, thereby improving the efficiency of the work operation.

The cut portion is so formed that the tip of the cut portion is directed toward the coil end, so that the cut portion will not be caught by any of the phase windings during the insertion of the interphase insulating sheet. Thus, the interphase insulating sheet is smoothly inserted between the phase windings during the assembling and, therefore, the efficiency of the work operation in inserting the interphase insulating sheet is maintained. In the first embodiment as described above, the cut portion 20e is provided in the part of the first interphase insulating sheet 20 which is not located between any two of the phase windings 11 through 13 and where the first interphase insulating sheet 20 is exposed, so that the provision of the cut portion 20e does not cause deterioration of insulation of the phase windings. The cut portion 20e has the inverted-V shape in the first preferred embodiment. However, the cut portion may have any other shape as far as it has a tip or a head portion that is engaged with the phase winding. For example, the cut portion may have a semicircular, rectangular or tongue shape. It is noted that this head portion should be formed such that its distal or free end is directed opposite to the core.

Figure 5:
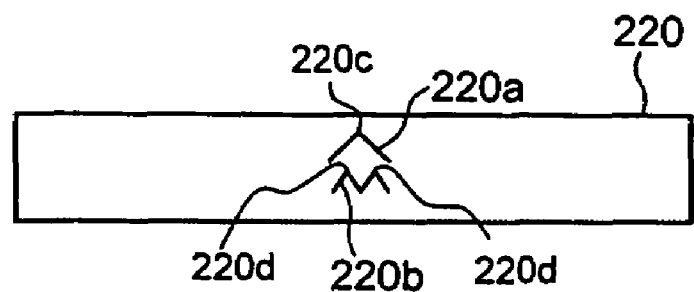
FIG. 5 is a view of a first interphase insulating sheet according to a second preferred embodiment.

The following will describe a second preferred embodiment that differs from the first preferred embodiment in shape of the cut portion. FIG. 5 shows the shapes of the cut portions in the first interphase insulating sheet 220 of the second preferred embodiment. The first interphase insulating sheet 220 is formed with an inverted V-shaped cut portion 220a and an M-shaped cut portion 220b, having tips 220c and 220d, respectively. Like the cut portion 20e of the first interphase insulating sheet 20 of the first preferred embodiment, the cut portions 220a and 220b are bent toward the side on which the first interphase insulating sheet 220 is out of contact with the U-phase winding 11, that is, bent toward the radially inward direction of the core 50 when the first interphase insulating sheet 220 is inserted in the stator 10 (cf. FIG. 1). The second interphase insulating sheet (not shown) has cut portions having substantially the same shape as those of the first interphase insulating sheet 220.

The interphase insulating sheet is thus formed with plural cut portions and, therefore, the cut portions of the interphase insulating sheet are engaged with the phase winding more easily than in the first preferred embodiment. This more effectively prevents the interphase insulating sheet from moving away from the core toward the coil end, thereby improving the efficiency of the work operations. Furthermore, forming the cut portions differently from each other in size in the interphase insulating sheet, different tips are formed. The different tips portions are engaged with windings of various conditions in different states.

Figure 6:
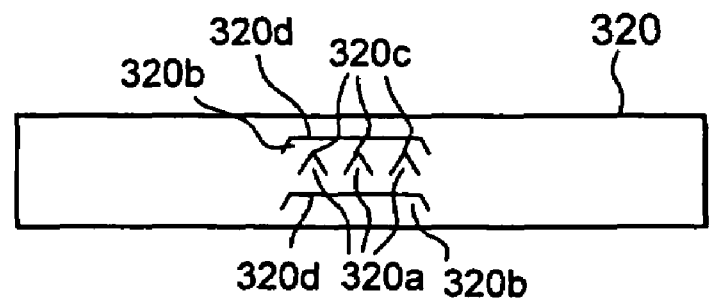
FIG. 6 is a view of a first interphase insulating sheet according to a third preferred embodiment.

The following will describe a third preferred embodiment. FIG. 6 shows the shape of the cut portion in the first interphase insulating sheet 320 of the third preferred embodiment. As shown in FIG. 6, the first interphase insulating sheet 320 is formed with three inverted V-shaped cut portions 320a arranged in close apposition thereby to form therein three tips 320c. The first interphase insulating sheet 320 is formed with additional two wide tongue-shaped cut portions 320b, between which the three cut portions 320a are located. Each cut portion 320b is formed in the shape of part of an isosceles trapezoid, having two sides corresponding to two legs of the trapezoid and a side corresponding to the upper base (or the short base) as a head portion 320d. The upper side of the cut portion 320b or the head portion 320d is substantially longer than the leg sides thereof, so that the cut portions 320b are more rigid than the counterparts of the first and second embodiments. This more effectively prevents the first interphase insulating sheet 320 from moving toward the coil end side. A second interphase insulating sheet (not shown) may have the same shape as that of the first interphase insulating sheet 320.

The cut portions in the third preferred embodiment include the inverted-V shaped cut portions and the wide tongue-shaped cut portions. However, the cut may have any other shape as long as it has a tip or a head portion that is engaged with the phase winding. For example, the cut portion has a semicircular shape or a rectangular shape. In the third preferred embodiment, the interphase insulating sheet is provided with the cut portions having different shapes. The different cut portions are engaged with windings of various conditions in different states.

In the second and third preferred embodiments, the second interphase insulating sheet may have cut portions that differ from those of the first interphase insulating sheet in shape. For example, the first interphase insulating sheet may have the shape as shown in FIG. 2, and the second interphase insulating sheet may have the shape as shown in FIG. 5 or FIG. 6.

The present examples and embodiments are to be considered as illustrative and not restrictive, and the invention is not to be limited to the details given herein but may be modified within the scope of the appended claims.

What is claimed is:

1. An interphase insulating sheet for use in a stator including a core and a multiphase winding having a plurality of phase windings and for insulating the phase windings from one another, the interphase insulating sheet comprising:
   a cut portion formed in the interphase insulating sheet for engaging with the phase windings when a force that moves the interphase insulating sheet away from the core is applied to the interphase insulating sheet after the interphase insulating sheet has been inserted in the stator, the cut portion indicating a direction opposite to a direction in which the interphase insulating sheet is inserted in the stator.

2. The interphase insulating sheet according to claim 1, wherein the cut portion is bent so that the cut portion is engaged with the adjacent phase winding when said force that moves the interphase insulating sheet away from the core is applied to the interphase insulating sheet after the interphase insulating sheet has been inserted in the stator.

3. The interphase insulating sheet according to claim 1, wherein the interphase insulating sheet is installed in the stator so that the cut portion is not located between any two of the phase windings.

4. The interphase insulating sheet according to claim 1, wherein the cut portion has an inverted-V shape.

5. The interphase insulating sheet according to claim 1, wherein the cut portion has an M shape.

6. The interphase insulating sheet according to claim 5, further comprising a cut portion formed adjacent to the M-shaped cut portion and having an inverted-V shape.

7. The interphase insulating sheet according to claim 1, wherein the cut portion has a tongue shape.

8. The interphase insulating sheet according to claim 7, wherein the cut portion is formed in shape of part of an isosceles trapezoid.

9. The interphase insulating sheet according to claim 7, further comprising:
   a cut portion formed having a tongue shape; and
   cut portions formed between the two tongue-shaped cut portions and each having an inverted-V shape.

10. The interphase insulating sheet according to claim 1, wherein the cut portion has a tip or a head portion engaged with the phase winding.

11. A stator comprising:
   a core;
   a multiphase winding wound on the core, the multiphase winding including a plurality of phase windings; and
   an interphase insulating sheet installed between the phase windings for insulating the phase windings from one another, the interphase insulating sheet including:
   a cut portion formed in the interphase insulating sheet for engaging with the phase windings when a force that moves the interphase insulating sheet away from the core is applied to the interphase insulating sheet after the interphase insulating sheet has been inserted in the stator, the cut portion indicating a direction opposite to a direction in which the interphase insulating sheet is inserted in the stator.

12. The stator according to claim 11, wherein the cut portion is bent so that the cut portion is engaged with the adjacent phase winding when said force that moves the interphase insulating sheet away from the core is applied to the interphase insulating sheet after the interphase insulating sheet has been inserted in the stator.

13. The stator according to claim 11, wherein the interphase insulating sheet is installed in the stator so that the cut portion is not located between any two of the phase windings.

14. The stator according to claim 11, wherein the cut portion has an inverted-V shape.

15. The stator according to claim 11, wherein the cut portion has an M shape.

16. The interphase insulating sheet according to claim 15, wherein the interphase insulating sheet further comprises a cut portion formed adjacent to the M-shaped cut portion and having an inverted-V shape.

17. The stator according to claim 11, wherein the cut portion has a tongue shape.

18. The interphase insulating sheet according to claim 17, wherein the cut portion is formed in shape of part of an isosceles trapezoid.

19. The interphase insulating sheet according to claim 17, wherein the interphase insulating sheet further comprises:
   a cut portion formed having a tongue shape; and
   cut portions formed between the two tongue-shaped cut portions and each having inverted-V shape.

20. The interphase insulating sheet according to claim 11, wherein the cut portion has a tip or a head portion engaged with the phase winding.

* * * * *